July 10, 1956 M. S. WEINSTEIN 2,754,394

APPARATUS FOR SPOT WELDING OF THIN METAL

Filed March 23, 1953 2 Sheets-Sheet 1

INVENTOR
MARVIN S. WEINSTEIN

BY G. D. O'Brien
R. M. Hicks
ATTORNEYS

July 10, 1956 M. S. WEINSTEIN 2,754,394
APPARATUS FOR SPOT WELDING OF THIN METAL
Filed March 23, 1953 2 Sheets-Sheet 2
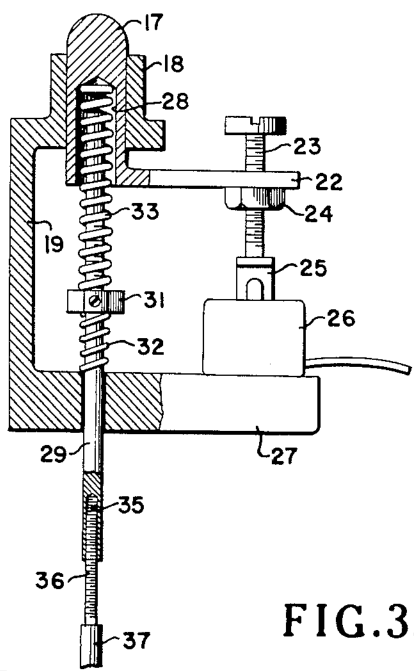
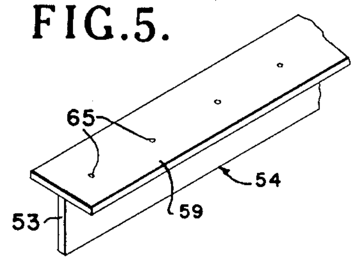
FIG.6.
67
69
66
69
68
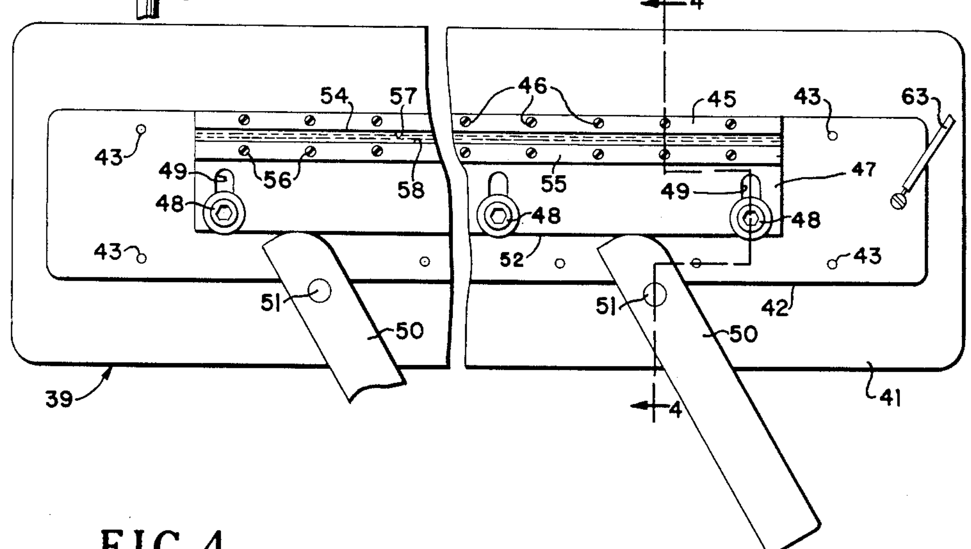
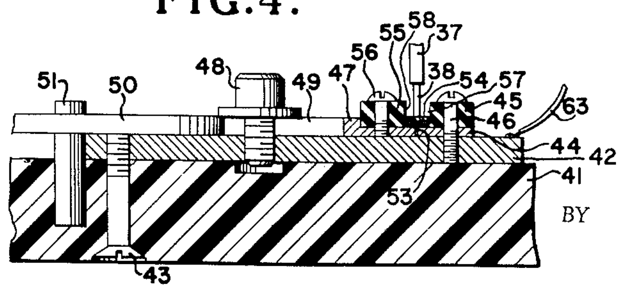
INVENTOR
MARVIN S. WEINSTEIN
BY
G. D. O'Brien
R. M. Hicks
ATTORNEYS United States Patent Office 2,754,394

Patented July 10, 1956

1

2,754,394

APPARATUS FOR SPOT WELDING OF THIN METAL

Marvin S. Weinstein, Washington, D. C.

Application March 23, 1953, Serial No. 344,254

2 Claims. (Cl. 219—4)

(Granted under Title 35, U. S. Code (1952), sec. 266)

The invention described herein may be manufactured and used by or for the Government of the United States of America for governmental purposes without the payment of any royalties thereon or therefor.

The present invention relates to the spot welding of thin metals. More particularly the invention relates to apparatus for the condenser welding of thin metal strips such as used in the forming of structural members of miniature models of ordnance devices and to provide T, I or other such forms without burning the metal or causing oxidation thereof.

Prior art methods were found to be not satisfactory for the spot welding of thin metal strips in that such methods when used with thin metal caused burning away of the metal resulting in imperfect welds.

The present invention obviates the disadvantages of the prior art by providing apparatus in which very thin stainless steel for example of a thickness from .005 to .025 inch is spot welded by a technique in which a well known condenser discharge circuit is employed, the intense welding heat being applied for a period of short duration, from .001 to .010 second. It has been found that the voltage to which the condenser is charged must be closely controlled in order to prevent the burning of the thin metals employed.

Furthermore, the pressure applied to the welding rod must be maintained within close limits, the weld being initiated prior to reaching maximum pressure. The diameter of the electrode is also a matter requiring close control. If the diameter is too large no weld results, while if it is too small the concentration of heat is too great and the material burns. A diameter of about 1/16 inch has been found to be ideal for successful welding of thin metals in employing the method of the present invention.

An important factor in preventing burning of the material during welding is the wetting of the work with alcohol or other such liquids having the qualities of rapid evaporation and the prevention of oxidation. Burning of the metal is prevented by rapid dissipation of the welding heat by evaporation of the alcohol or other such liquid. The liquid treatment by the coating action thereof prevents oxidation of the welded metal and the tip of the welding rod.

The apparatus of the present invention provides an improved clamping jig for securing the thin metal strips in position for welding, for ensuring an even electrical contact along the length of the strips and rapid passage of the welding current through as little of the thin strips as is necessary to accomplish a good weld, thus to further prevent overheating of the metal.

An object of the present invention is to provide apparatus for condenser welding thin metals in abutted position which avoids burning of the metal.

Another object is to provide apparatus for welding thin metals in which oxidation of the welded metals and the welding rod is prevented.

Still another object is to provide apparatus for spot welding thin metals into T and I forms in which the weld is consummated under a predetermined pressure, the pressure being increased thereafter thus ensuring a more effective weld.

A further object is to provide apparatus for providing a plurality of spot welds on thin metal in successive order which are highly effective, quickly accomplished, and cause no damage to the welded metals.

A still further object is to provide apparatus for accomplishing the spot welding of thin metals wherein the metal strips are clamped in a jig which ensures good electrical contact along the length of the metals to be welded thus preventing burning of the metal.

Other objects and many of the attendant advantages of this invention will be readily appreciated as the same becomes better understood by reference to the following detailed description when considered in connection with the accompanying drawings wherein:

Fig. 2 is a view partly in section of the welding rod and switch apparatus;

Fig. 3 is a plan view of the strip clamping device;

Fig. 4 is a sectional view taken along the line 4—4 of Fig. 3; and

Figs. 5 and 6 are perspective views of finished T and I members.

Figure 1:
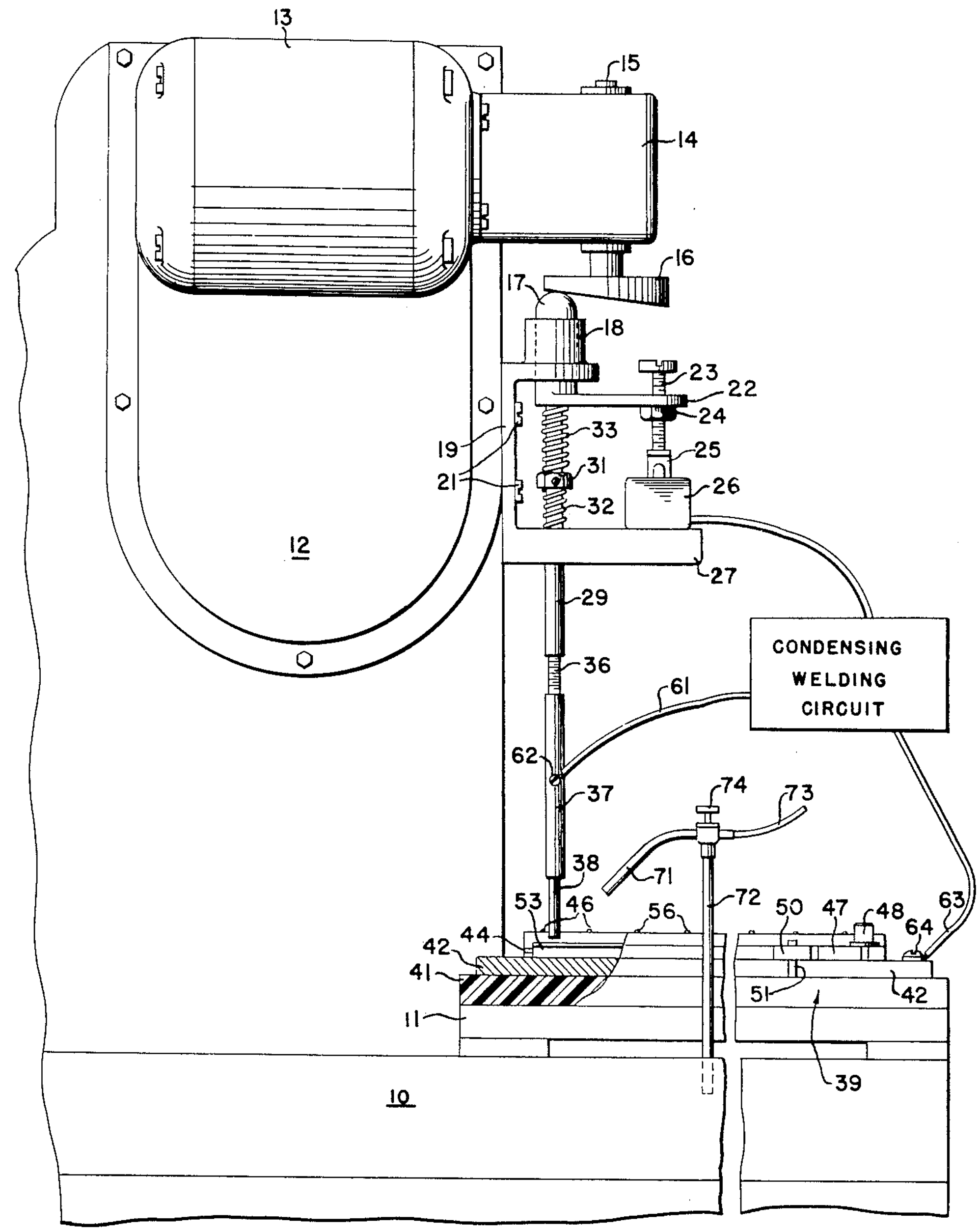
Fig. 1 is a view in side elevation of the apparatus employed with the present invention, the connection thereof with a condenser welding circuit being shown schematically.

Referring more particularly to the drawings wherein like numerals indicate like parts throughout the several views, 10 indicates generally a stand on which the device of the present invention is mounted having a movable platform 11 which is capable of translational movement. Mounted on apparatus 10 as by mount 12 is an electric motor 13 having a gear box 14 secured thereto, the motor driving the gears of the box 14 to provide a gear reduction between the motor shaft and shaft 15 of box 14. If desired, the gear box 14 may include provisions for varying the ratio of gear reduction. Shaft 15 has secured thereto a circular cam member 16 which engages plunger 17 slidably supported in a sleeve 18 fixed to or forming a part of bracket 19. Bracket 19 is secured to the apparatus 10 in any desired manner such, for example, as by screws 21.

Plunger 17 is provided with a lateral arm 22 which has threaded therein a vertically arranged screw 23 locked in adjusted position by lock nut 24. The lower end of screw 23 engages spring arm 25 of switch 26 mounted on arm 27 of frame 19, switch 26 closing a condenser welding circuit when screw 23 reaches a predetermined position as cam 16 moves plunger 17 downwardly. Such welding circuit may take the form of the one disclosed in Fig. 11 of U. S. Patent No. 2,493,927, where electrical energy is stored in a condenser (202) and is discharged through a transformer (209) upon closing of a circuit control switch (212), or any other condenser discharge circuit commonly employed in welding machines may be used instead.

Plunger 17 is provided with an axial bore 28 extending part way therethrough and into which a shaft 29 extends. Shaft 29 is also slidably mounted in arm 27 of bracket 19. Adjustably mounted on shaft 29 is a collar 31, a helical spring 32 being sleeved about shaft 29 and interposed between collar 31 and arm 27 and a helical spring 33 being interposed between collar 31 and the inner end of bore 28. As is clearly shown in Fig. 2, a clearance is provided between the inner end of bore 28 and the upper end of shaft 29 thus to increase the tension of spring 33 as cam 16 forces plunger 17 downwardly as will be more fully described hereinafter. It is desired that spring 32 be sufficiently weak to permit compression thereof by spring 33 as plunger 17 is moved downwardly thereby, the function of spring 32 being to return shaft 29 to the raised position thereof after having been moved downwardly.

Collar 31 may threadedly engage shaft 29 for adjustment thereon and a set screw 34 or other locking device may be provided for locking the collar 31 in adjusted position.

Shaft 29 is provided with a threaded socket 35 at the lower end thereof for receiving the threaded end 36 of welding rod 37 which has a small diameter welding tip 38 at the lower end thereof.

Mounted on platform 11 is a work supporting jig indicated generally at 39 and comprising an insulator base 41, a mounting plate 42 of copper or other metal having good electrical conducting qualities being secured on base 41 by a plurality of screws 43. A fixed copper plate 44 has a step-cut insulator bar 45 resting on the top thereof and both plate 44 and bar 45 are secured to plate 42 by a plurality of screws 46.

A slidable plate 47 is mounted for sliding motion on plate 42 by a plurality of screws 48 set in a plurality of guide slots 49 in plate 47, plate 47 being movable when screws 48 are loosened and the plate being locked in adjusted position when screws 48 are drawn up tight.

Cam levers 50 are pivoted at 51 on insulator base 41 and are adapted to be rocked into engagement with edge 52 of plate 47, thus causing plate 47 to move in a direction to clamp web strip 53 of T bar 54 against fixed plate 44 when screws 48 are loosened. Plate 47 is provided with a step-cut insulator bar 55 similar to bar 45, bar 55 being secured to plate 47 by screws 56. The step-cuts are formed at mutually adjacent sides of bars 45 and 55 are indicated at 57 and 58, respectively.

Horizontal strip 59 of T bar 54 is placed in the recess formed by step-cuts 45 and 55, strip 59 having the center thereof resting on the butt edge of strip 53 which is firmly clamped between plates 44 and 47, these plates engaging substantially the entire sides of strip 53 thus ensuring a minimum distance of travel for the welding current through the thin metal of strip 53 to prevent overheating or burning thereof. Strip 53 also projects slightly above the lower face of cuts 45 and 55 to ensure good welding contact of strips 53 and 59.

In operation platform 11 is moved translationally by any desired means (not shown) either in a slow continuous motion or by steps governed by the movement of plunger 17. The step motion may be accomplished by a mechanism (not shown) energized by switch 26. It is assumed that strips 53 and 59 of T bar 54 have been set up in the work supporting jig 39. Motor 13 is energized, rotating cam 16 which imparts to plunger 17 a reciprocating motion which moves tip 38 of welding rod 37 into engagement with strip 59 and forces strip 59 into close engagement with strip 53. It is to be noted that strip 59 is completely insulated from metal parts except for contact with tip 38 and strip 53. As plunger 17 moves downwardly spring 33 is compressed causing increasingly greater pressure to be applied to strip 59 through tip 38. When a predetermined pressure has been attained switch 26 is closed by pressure of screw 23 against spring arm 25, the exact relationship of the closing of switch 26 to the position of plunger 17 being adjustable to provide a desired pressure at the welding tip 38 when the welding is consummated.

When switch 26 closes the condenser welding circuit (shown schematically in Fig. 1) is energized to provide a suitable welding current of short duration through conductor 61 to welding rod 37, the connector being shown at 62, and through conductor 63 to the plate 42 the connector being shown at 64. In this manner a spot weld is accomplished between strip 59 and strip 53. Cam 16 continues to compress spring 33 which further increases the pressure of tip 38 on strip 59, and of strip 59 against strip 53 which ensures complete and thorough welding of the two strips.

It is to be understood that prior to welding, the strips 59 and 53 are wetted with a liquid such, for example, as alcohol having the qualities of quick evaporation and prevention of oxidation, the wetting being accomplished by any desired means, either by hand or by automatic feed means whereby a measured quantity of liquid is applied to the strips as they are moved past a point ahead of rod 37 during the travel of the platform 11.

As the cam 16 continues to rotate, plunger 17 rises under action of spring 33 until all tension on tip 38 is released, whereupon spring 32 lifts tip 38 from engagement with strip 59 thus completing a cycle of welding operation. The platform 11 is moved to a new position for the next welding cycle if the step system of motion is employed or the platform continues to move during the welding cycle if the continuous motion system is employed. It is understood that shaft 29 and rod 37 have sufficient flexibility to permit tip 38 to maintain engagement with a point to be welded during the welding operation when the continuous motion system is used.

The distance between spot welds may be adjusted by changing the speed of travel of the platform 11 with respect to the speed of rotation of cam 16, it being clear that the welding cycles may be continued from one end of the strips to the other end thereof.

Figs. 5 and 6 illustrate some of the structural members formed by the method and apparatus of the present invention, a T form being shown in Fig. 5 having the vertical member or strip 53 and the horizontal member or strip 59, the spaced spot welds being shown at 65. An H or I form is shown in Fig. 6 and has a vertical member 66 and upper and lower horizontal members 67 and 68 respectively having spaced spot welds 69. It is, of course understood that channel members and other forms may also be made.

If desired, shown in Fig. 1 a nozzle 71 may be mounted on bracket 72 supported by apparatus 10 to provide for wetting of the strips with the cooling and non-oxidizing fluid, a tube or hose 73 being provided to conduct the fluid from a reservoir (not shown). A regulator valve 74 may also be provided to meter the quantity of fluid fed to nozzle 71.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In an apparatus for use with a normally open condenser discharge circuit for welding strips of thin metal to form webbed structural members, comprising, in combination, a base having a vertical member, a platform mounted on said base and movable at will with respect thereto, means mounted on said platform and movable therewith for holding said strips of metal in position for welding and establishing an electrical connection therebetween, a spot welding rod mounted on said vertical member for movement selectively into and out of engagement with one of said strips, cam means for causing gradually increasing pressure to be exerted on said rod for moving the rod into engagement with said one strip and pressing the strips together, means for driving said cam means, switch means responsive to the driving of said cam means for closing said circuit to provide a welding current of short duration when a predetermined pressure is exerted on the strips by the rod for welding the strips, said cam means continuing to exert gradually increasing pressure through the rod on said strips after welding, conductor means connecting the rod and the holding means in said circuit, said welding rod being mounted for vertical movement, spring means associated with said rod urging said rod upwardly, said cam means comprising a cam rotatable about a vertical axis, a plunger mounted on said member for vertical movement, said plunger having an axial bore in its lower portion in which bore the upper end of the rod is received, a spring surrounding the end of the rod with one end of the spring seated against the inner end of said bore and the other end of the spring seated against a collar on the rod, an arm secured to said plunger and extending laterally therefrom, said switch means having a control to close the same, adjustable means on said arm and contacting said control, said plunger having its top in engagement with said cam and movable thereby during rotation of the cam, whereby said control is actuated to close the switch means when the plunger has moved a predetermined amount and a predetermined pressure is exerted upon the welding rod.

2. In an apparatus as in claim 1, wherein said means for holding said strips comprises a fixed plate and a cooperating slidable plate, said plates being of electro-conducting material, and channel means associated with said plates comprising a step-cut insulator bar on said fixed plate and a step-cut insulator bar on said slidable plate.

References Cited in the file of this patent

UNITED STATES PATENTS

| | | |
|---|---|---|
| 1,155,497 | Lindemann | Oct. 5, 1915 |
| 1,360,948 | Hendry | Nov. 30, 1920 |
| 1,553,344 | Weatherwax | Sept. 15, 1925 |
| 1,762,694 | Long | June 10, 1930 |
| 1,779,563 | Siebs | Oct. 28, 1930 |
| 1,806,121 | Siebs | May 19, 1931 |
| 1,963,729 | Alexay | June 19, 1934 |
| 2,441,043 | Stoudt | May 4, 1948 |
| 2,473,927 | White | June 21, 1949 |
| 2,474,816 | Briggs | July 5, 1949 |
| 2,683,204 | Roach | July 6, 1954 |